United States Patent
Halldorsson

(10) Patent No.: US 7,933,002 B2
(45) Date of Patent: Apr. 26, 2011

(54) METHOD AND LIDAR SYSTEM FOR MEASURING AIR TURBULENCES ON BOARD AIRCRAFT AND FOR AIRPORTS AND WIND FARMS

(75) Inventor: Thorsteinn Halldorsson, Poing (DE)

(73) Assignee: Airbus Deutschland GmbH, Hamburg (DE)

( * ) Notice: Subject to any disclaimer, the term of this patent is extended or adjusted under 35 U.S.C. 154(b) by 431 days.

(21) Appl. No.: 11/996,210

(22) PCT Filed: Jul. 19, 2006

(86) PCT No.: PCT/EP2006/007085
§ 371 (c)(1),
(2), (4) Date: Jul. 30, 2008

(87) PCT Pub. No.: WO2007/009759
PCT Pub. Date: Jan. 25, 2007

(65) Prior Publication Data
US 2009/0310118 A1   Dec. 17, 2009

(30) Foreign Application Priority Data

Jul. 21, 2005   (DE) .......................... 10 2005 034 729

(51) Int. Cl.
*G01P 3/36*   (2006.01)
(52) U.S. Cl. ........................................................ 356/28
(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

| | | | |
|---|---|---|---|
| 5,610,703 A * | 3/1997 | Raffel et al. | 356/28 |
| 6,578,961 B2 * | 6/2003 | Vaez-Iravani | 356/237.2 |
| 2004/0141170 A1 * | 7/2004 | Jamieson et al. | 356/5.01 |
| 2008/0190192 A1 * | 8/2008 | Bommier et al. | 73/170.11 |

FOREIGN PATENT DOCUMENTS

WO   WO2006103325   * 10/2006

* cited by examiner

*Primary Examiner* — Thomas H Tarcza
*Assistant Examiner* — Luke D Ratcliffe
(74) *Attorney, Agent, or Firm* — Thompson Coburn LLP

(57) ABSTRACT

The invention relates to a method for measuring air turbulences with a lidar system, particularly on board aircraft during which a pulsed expanded laser beam (12) of a predetermined wavelength is emitted up to a spatial area and light backscattered from this spatial area is received. At a first point in time t1 and at a second point in time t2 after emitting a laser pulse (L), the intensity distribution in the cross-section of the backscattered light is measured, and an air turbulence in a measuring field defined by points in time t1 and t2 is determined from the comparison of both intensity distributions. Images of speckle patterns are recorded with the aid of cameras (21, 22). An evaluation unit (30) conducts a cross correlation in order to render the turbulence visible and to display it on a monitor (35).

23 Claims, 6 Drawing Sheets

METHOD AND LIDAR SYSTEM FOR MEASURING AIR TURBULENCES ON BOARD AIRCRAFT AND FOR AIRPORTS AND WIND FARMS

CROSS-REFERENCE TO RELATED APPLICATIONS

The present application claims the benefits of PCT/EP2006/007085, filed Jul. 19, 2006 and DE 10 2005 034 729.0, filed Jul. 21, 2005, and entitled "Method And Lidar System For Measuring Air Turbulences On Board Aircraft And For Airports And Wind Farms" and is incorporated herein by reference in its entirety.

The present invention relates to a method for measuring air turbulence according to the precharacterising part of claim 1, to a lidar system for measuring air turbulence according to the precharacterising part of claim 13, and to the use of a lidar system on board an aircraft, in particular on board an aeroplane or helicopter.

In aviation, air turbulence in the atmosphere is very troublesome in relation to the course of flow at wing surfaces, because it leads to increased drag and to very considerable changes in aerodynamic lift. Any measures to avoid or reduce air turbulence require that air turbulence be detected and measured in a timely manner.

However, measuring wind conditions and turbulence conditions is also important, for example in the operation of wind farms. In the case of wind farms, the efficacy of power generation depends on the correct placement of the rotors in relation to local wind conditions and turbulence conditions. For these reasons, it is particularly important to the efficient and safe operation of wind farms that precise non-contact-type measuring of the characteristic wind field and field of vorticity at the selected site be carried out at different meteorological conditions prior to construction. Measuring such air data with the use of meteorological measuring stations, and in some cases with the use of Doppler lidar systems, at present is still considered to be involved, expensive and inaccurate.

At airports, turbulence emanating from an aircraft that is taking off or landing, the so-called wake vortex, can have a considerable effect on the flight behaviour of an aircraft flying behind. The forces and torques of a wake vortex can, for example, cause drifting away or rolling of smaller aircraft. In many cases critical flight states have occurred, which in some extreme situations have resulted in accidents.

In many countries, in the operation of heavily frequented airports, wake vortices have also become a serious economic problem. As a result of uncertainty concerning the intensity and position of wake vortices, the International Civil Aviation Organisation (ICAO) prescribes a minimum time interval (separation time) between takeoffs and landings of approximately 2-3 minutes, depending on the size of the aircraft flying in front and behind. On the other hand, with the increase in traffic at large airports, a future general reduction in the takeoff and landing sequences to below one minute is striven for. There is thus an urgent search for a solution to guide aircraft with a considerably reduced safety risk through the field of influence of the wake vortices. However, this requires timely detection and measuring both when the visibility is reduced and when conditions are clear.

Wake vortices arise as a result of different airflow at the top and at the bottom of the wing during break-away of flow at the wing edges and wingtips, with the intensity of wake vortices depending on the wingspan and weight of an aircraft. In the vertical plane behind both wings, centred at approximately ⅔ of their length, wake vortices generate spiralling air rotors that rotate in opposed directions with a diameter in the order of magnitude of half a wing length. When leaving the aircraft, the wake vortices drift downwards somewhat in altitude and break up into smaller vortices until after several minutes they have given off their entire kinetic energy as heat to the surrounding air. Lateral winds and vertical winds move the vortices as a whole and have an influence on their decay. Exhaust gases from the engines, above all hot air, soot and water vapour are admixed to the wake vortices and in part assume the same movement flow as said vortices. In the stratosphere, wake vortices are, for example, visible on the condensation trails of the water vapour behind aircraft.

A wake vortex arises as a result of aerodynamic lift, and can therefore neither in the near nor in the remote future be completely suppressed by new wing designs. However, its intensity can be reduced by means of various additional aerodynamic measures on the wing, e.g. by fanning out or partly splitting the airflow after it leaves the wing.

For a following aircraft it is above all the asymmetries of the air movements on both wings and the sudden aerodynamic lift or the downwind, which near the ground can affect the entire aircraft, that are hazardous. These air movements must therefore be measured in advance, i.e. from a certain minimum distance, at sufficient spatial resolution along and across the axis of flight. Since landing procedures have to be carried out under all possible weather conditions, wake vortices must be able to be detected and measured both in dull weather, i.e. when the visibility is poor, and in clear weather, i.e. when the visibility is unimpeded.

Up to now during dull weather, i.e. in conditions of rain, fog or cloud, the movement of larger particles suspended in the air or of hydrometeors with a diameter of between 10 μm and several millimeters at distances of several tens of nautical miles has been recorded with a scanning Doppler radar. Doppler radar devices installed at an airport or in an aircraft can therefore detect airstreams such as wind shear or vortices in dull weather. The presence of such phenomena can be communicated or displayed to pilots who can then fly around them at a safe distance.

However, the radar wavelength in the centimeter- to millimeter range is too long to detect during clear weather a useable echo of the remaining, smaller, aerosols, e.g. with a diameter of below one micrometer. For this reason Doppler infrared lidars with a significantly shorter wavelength in the micrometer range are used on a trial basis at some airports with high volumes of traffic. Since the backscatter from the aerosols, due to their varying and often small concentration, can be vary variable and even imperceptible, even the backscatter from the significantly smaller air molecules is used for detection in a UV Doppler lidar as a target size.

Printed publication DE 103 16 762 A1 describes a method for acquiring windspeeds with a Doppler lidar system. In this method a laser beam is emitted by a transmitting device to a spatial area, and the light that is backscattered from the spatial area is received. In order to determine a Doppler shift, an interferogram is generated whose intensity distribution is compared to reference patterns which have previously been determined for defined parameters. From the comparison, the Doppler shift is determined as a measure of the windspeed.

Ground-mounted meteorological measuring instruments or Doppler radars and Doppler lidars provide a global overview of the wind- and vortices situation at airports. However, this is only sufficient to issue general warnings of critical vortex situations to all affected aircraft, without taking into account the hazard to individual aircraft. Any future general shortening in takeoff and landing sequences at all airports is only possible if each aircraft has its own on-board measuring system that in flight in all weather conditions detects individual vortices on its flight path in a timely manner and immediately evaluates their hazard potential.

Doppler radars in automobiles, which radars have a transmission frequency of 24 GHz and 77 GHz, are able to detect in dull weather at a small angular range solid obstacles outside the driver's visual range. This is due to the improved range of the radar radiation through the mist when compared to that of visible light. However, at these frequencies the atmosphere is not at all completely transparent, instead, a clear signal from the hydrometeors of the mist itself is received, which in such an automotive application is masked. However, this background signal of the mist would in principle be suitable for detecting and imaging vortex movement in the air by means of the hydrometeors that are moved as well. These radar frequencies are associated with a special advantage in that for general traffic they have been given international radio approval, and they would thus be particularly suitable for radar-detection of wake vortices from an aircraft in dull weather.

Vehicle radars are associated with a further advantage in that at present they can already be produced so as to be very compact and economical. If they were to be expanded to carry out the function of a wake vortex warning for aircraft, or for flight control, air movements, in addition to their distance, would at the same time have to be imaged in a larger area perpendicular to the direction of flight at several positions in front of the aircraft. Scanning a larger angular range in front of the aircraft could at present be carried out electronically with phase-coupled antenna arrays in a short time at a high repetition frequency. At present there are efforts to further develop these compact radar units into aircraft-borne systems for wake vortex recognition in cloud, heavy rain and fog, with good distance resolution and lateral resolution.

However, a successful future radar solution for dull weather of this type in itself is not sufficient for reliably detecting vortices during aircraft operation. This is because the vortices are just as great a hazard in clear weather as they are in dull weather. Efforts have therefore been made to supplement the radar with a lidar, i.e. involving additional scanning in the optical range of the spectrum in which the smaller air particles can be detected.

However, Doppler lidars for measuring in the clear atmosphere are nowhere near as compact as Doppler radars. With present-day technology their transmission beam can only be moved with mechanical scanners of low angular velocity. This then requires an extended duration of measuring in which the aircraft and the turbulence move along the axis of measuring. Since the measuring values are thus not obtained in an isochronous manner they provide an image of the air movement at a given time in front of the aircraft, which image is distorted in time. The low speed-resolution is particularly disadvantageous in axial direction, which due to the low pulse repetition frequency of lidars, in contrast to radars, cannot be further improved by averaging a large number of measurements.

When compared to Doppler radars, Doppler lidars are at present overall very complicated as far as their design is concerned and are expensive, and therefore not suitable for installation in smaller aircraft, which are mostly at risk from wake vortices of large aircraft flying ahead.

Printed publication US 2003/0009268 A1 describes a forecasting system for wind turbulence for measuring the velocity of a three-dimensional airstream, with the system being based on the Doppler effect. In this arrangement an aircraft emits a laser beam that scans a spatial area in a cone-shaped manner. The light backscattered from this spatial area is received by means of an optical system, and from this, by means of the Doppler effect, the velocity of an air vortex in the spatial area is determined.

U.S. Pat. No. 4,195,931 describes a device for determining the location and intensity of air turbulence, wherein a pulsed laser beam is emitted into a spatial area, and the backscattered laser light is analysed. In this arrangement the interference pattern of the received light is determined by means of a spectroscope. The spectrum of the backscattered light is correlated with the standard spectrum without the presence of air turbulence.

Patent specification DE 40 13 702 C2 describes a method and a device for acquiring turbulence in the atmosphere, in which method and device a laser light bundle of a predetermined frequency is emitted to a selected spatial area, and the light backscattered from this spatial area is captured and overlaid with the emitted light. The Doppler shift between the frequencies of the emitted and of the backscattered light is determined, and from said Doppler shift the sense of direction and the extent of the windspeed in the direction of measuring are determined. In this arrangement a laser light bundle is split into two partial bundles, wherein the first partial bundle is emitted to the spatial area, and the light backscattered from this spatial area is overlaid with the second partial bundle.

U.S. Pat. No. 6,184,981 B1 discloses a method in which a pulsed laser beam is emitted and reflected from a target, wherein the received signal spectrum is compared to a reference spectrum.

The article "Two-channel direct-detection Doppler lidar employing a charge-coupled device as a detector" by Irgang, Todd D., et al., Applied Optics, vol. 41, no. 6, of 20 Feb. 2002, describes a two-channel Doppler lidar that comprises a CCD as a detector. In two separate channels the lidar system measures wind movement by means of the light backscattered from aerosols and molecules, wherein the light of one channel is fed to the other channel.

It is the object of the present invention to propose a suitable method for detecting turbulence and wake vortices in clear weather.

Furthermore, a suitable measuring system is to be stated that can be compact in design and that renders visible the inhomogeneity and movement of air in a larger area, i.e. over a larger angular range, in an isochronous manner perpendicular to the axis of measuring. The measuring system is to be applicable for telemetry, i.e. for measuring at a defined longer distance and in a limited volume. In this arrangement measuring should be insensitive to any movement in the direction of the axis of measuring.

This object is met by the method for measuring air turbulence according to claim 1, by the lidar system according to claim 12, and by the use of the lidar system according to claim 22.

In the method according to the invention for measuring air turbulence by means of a lidar system a pulsed expanded laser beam of a predetermined wavelength is emitted to a spatial area, and light backscattered from this spatial area is received, wherein at a first point in time t1 and at a second point in time t2 after emission of a laser pulse, the intensity distribution in the cross-section of the backscattered light is measured, and from the comparison of both intensity distributions the air turbulence in a remote measuring field is determined. With the invention it is possible to detect and image air turbulence and wake vortices in clear weather. The method is suitable in particular to be carried out on board aircraft in order to detect in flight any wake vortices that have been formed by aircraft flying ahead, which vortices are situated at a defined distance in the direction of flight. In this arrangement the distance of the measuring field is determined by the points in time t1 and t2, i.e. by the transit time of the emitted laser pulse that has been backscattered from air layers at various distances.

In this method it is not the axial Doppler frequency shift that is measured, but instead the decay of a laser beam, when penetrating air turbulence and wind, into a mixed fine-grained and coarse-grained intensity pattern, a so-called speckle pattern, is used.

Advantageously, by means of the respective measuring of the intensity distribution, such speckles, which arise during backscattering of the laser pulse from air molecules, are detected in the cross-section of the back-scattered light in order to determine air turbulence from a comparison of the speckle patterns. In other words, from a snapshot of the speckles any turbulence can be detected and measured.

Preferably, images of the intensity distributions are taken at the two points in time t1 and t2 by means of a camera at a defined duration of exposure, and from the images that arise an image representation of the refractive index variation in the measuring field is produced. In other words, by means of double images that are taken in quick succession, it is also possible to derive the air movement perpendicular to the axis of measuring or visual axis. Since the images simultaneously acquire a larger area that is determined by the imaging angle, there is no longer any need for time-consuming scanning, and the transverse spatial resolution or speed resolution is equally good over the entire angular range.

Splitting a laser beam, with an intensity gradient that over its cross-section has originally been homogeneous, into a grainy speckle pattern, granulations or speckles is a consequence of the varying lengths of the optical paths of the partial beams or elementary waves of the laser beam through regions in the air that have a different refractive index. Due to the coherence of the primary radiation these elementary waves scattered from the air components, i.e. both molecules and aerosols, are coherent among themselves. From one location to another within the beam, the amplitude and phase of the elementary waves then vary in relation to each other. Finally they are overlaid in space to form a complicated interference field of spatially distributed irregular intensity. In air movements such as vortices and associated changes in the structure of the refractive index the interference pattern, i.e. the speckles, is also modulated in space and time.

Refractive index variations in the air are predominantly caused by temperature differences. In wake vortices behind aircraft, pressure gradients and temperature gradients arise due to the air movement and its decay. In addition, close to the ground, temperature gradients in the air arise as a result of the surface of the earth being heated during the day and cooled during the night, which temperature gradients are disturbed by the wave vortices of aircraft that take off or land. Moreover, hot exhaust gases from engines, predominantly water vapour and carbon dioxide, are admixed to the turbulent air. Overall, during takeoff or landing a structured temperature field arises in the wake vortex behind an aircraft, which at the same time results in inhomogeneous distribution of the refractive index of the air.

In a manner that differs from that of the Doppler effect, in which from the axial frequency or wavelength shift of the backscattered laser light the transverse velocity component of the air movement is derived, and by means of scanning a display of turbulence over a larger area arises, with the use of the speckles the spatial inhomogeneity of the refractive index as a result of turbulence can be imaged isochronously over a larger area, and by comparing two individual images of the speckle distribution at different times can be derived, wherein the modulation over time of the refractive index or of the speckle pattern and in addition the transverse velocity component of the air movement is registered. The statistically distributed magnitude and intensity of the speckles is important to the application of said speckles. They are thus suitable for the unequivocal display of both fine structures and coarse structures of the refractive index distribution.

In this sense the refractive index variations in the proposed measuring system according to the invention assume a role that is similar to that of aerosols in the case of radar and lidar. Both are used as markers that are carried along by the air, and whose movements can then at the same time indicate air movement. The way this can be used to measure turbulence with the speckles in the sense of the invention is discussed in more detail below.

In the Kolmogorov-model description of the development of turbulence over time, which description is now generally accepted, it is assumed that turbulence in the atmosphere with the so-called "outer" diameter $L_o$ up to some tens or hundreds of meters decays over time in a cascading manner as a result of the inner friction of air to ever smaller eddies without there being any energy exchange with the surroundings, until at last they reach, at a minimum size $I_o$, the so-called "inner" diameter (of a magnitude of some millimeters) when the small eddies decay by giving off to the environment their entire kinetic energy as heat, predominantly by way of convection and diffusion. Over time this process results in the formation, within the eddies, of a fine-grained temperature structure field that only slowly disappears as a result of heat interchange with the surrounding air.

The refractive index n depends to a significantly greater extent on the temperature T than on fluctuations in the air pressure p, wherein a small influence of humidity in the air in the visual range of the spectrum can be neglected, wherein:

$$n=1+77.6\times10^{-6}(1+7.52\times10^{-3}\lambda^{-2})p/T$$

$$n=1+79\times10^{-6}p/T \text{ and } dn/dT=79\ p/T^2$$

wherein p denotes the air pressure in millibar, T the temperature in Kelvin, and $\lambda$ the wavelength in μm (in the example shown e.g. $\lambda=0.5$ μm).

The refractive index variation averaged over time is expressed, depending on the location, by the so-called refractive index structural function $D_n(x, r)$:

$$D_n(x,r)=<\{n(x+r)-n(x)\}^2>$$

wherein the variables x and r denote the three-dimensional spatial vectors.

When the amount of the distance vector r is between the outer and the inner diameters $L_o$ and $l_o$, the structural function can be stated as a function of the distance and of the refractive-index structure parameter $C_n^2(x)$ wherein:

$$D_n(x,r)=C_n^2(x)r^{2/3},\ l_o\leq r\leq L_o,\ r=|r|.$$

The refractive-index structure parameter $C_n^2$ is a measure of the strength of the refractive index fluctuations with the unit $[m^{-2/3}]$. Its value varies from $10^{-17}$ or less in the case of extremely weak turbulence to $10^{-12}$ in the case of very strong turbulence, near the ground and in wake vortices. The correlation between $C_n^2$ and the temperature fluctuations can be expressed as:

$$C_n^2=Idn/dT^2C_T^2=(79\times10^{-6}(P/T^2))^2C_T^2$$

wherein $C_T^2$ designates the temperature structure parameter.

According to the invention, the field of vorticity is measured by an expanded pulsed laser beam. For a distance r=1 m and $C_n^2=10^{-12}$ m$^{-2/3}$ as a rough estimate the phase shift is $10^{-6}$ m=1 μm or $2\pi$ at $\lambda=0.5$ μm, i.e. an average phase shift which according to theory results in the formation of distinct speckles in a large number of partial waves with overall statistically distributed phase shifts, along the direction of propagation of the expanded laser beam.

At every encounter of the partial waves with the smallest turbulence cells, each time they are diffracted at a diffraction angle of the magnitude of $\lambda/I_o=10^{-4}$ rad (for example at $\lambda=0.5$ µm and $I_o=5$ mm), which when traversing an extended path through the turbulence field results in clear beam migration and beam expansion.

A small amount of radiation energy is scattered from the air molecules and aerosols, wherein part of the scattered light comes back, i.e. in the direction of the transmitter. However, the intensity of the backscatter light is not regular over a cross-section of the expanded laser beam but instead, due to the speckle formation, is broken into islands of high intensity and low intensity, which islands reflect the spatial variations and variations over time of the refractive index in the turbulent air.

According to the invention, it is thus, for example, proposed to image and measure the transverse gradient of the spatial refractive-index inhomogeneities or the speckles by means of a measuring geometry common in lidar systems, in which measuring geometry a laser transmitter and a receiver are installed in the same location. In this arrangement an image is taken of the backscatter of an emitted pulsed expanded laser beam from the atmosphere, and the spatial distribution and distribution over time of its intensity are evaluated. For the purpose of imaging, for example an electronic camera system can be used as a receiver, which camera system periodically images and evaluates the three-dimensional intensity gradient of the backscattered light in the emitted expanded pulsed laser beam from a defined measuring distance at fixed time intervals.

Measuring is preferably carried out in rearward direction, i.e. in reflection. Furthermore, in the sense of the invention a time-resolved measuring process is preferred, in which from the imaging of the speckle field or of the airstream field an extended measuring area of limited thickness at a fixed distance from the measuring system is acquired. In this way, by means of speckle imaging, it is possible to render wind fields, turbulence fields and wake vortices visible in clear air, at a considerable distance, in individual "air screens".

The lidar system, according to the invention, for measuring air turbulence is, in particular, suitable for aircraft and comprises a laser for emitting a pulsed expanded laser beam of a predetermined wavelength to a spatial area; a detector for measuring the intensity distribution in the cross-section of the light backscattered from the spatial area at a first point in time t1 and at a second point in time t2 after emission of a laser pulse; a synchronisation unit that couples the detector to the laser in order to trigger measuring at the points in time t1 and t2; and an evaluation unit that from a comparison of the measured intensity distributions determines air turbulence.

With the lidar system according to the invention, air turbulence and wake vortices of aircraft flying ahead can be measured even in clear weather. Furthermore, the lidar system according to the invention can be designed so as to be very compact, so that it is suitable for use on board an aircraft.

Preferably, the detector is designed for determining the position of speckles that arise when the laser pulse is backscattered from air molecules, and the evaluation unit is designed, in particular, for comparing speckle patterns in order to determine air turbulence from them.

Advantageously the detector comprises at least one camera, which takes images of the intensity distributions at the two points in time t1 and t2 at a defined duration of exposure, wherein from the images that arise the evaluation unit produces, for example, an image representation of the refractive index variation in the measuring field. In this way it is possible to render air turbulence visible to the crew of aircraft.

The depicted lidar system according to the invention renders the three-dimensional movement flow of air turbulence in clear air measurable or visible. This takes place by taking images of the backscattered light from the cross-sectional area of the pulsed expanded laser beam that penetrates the turbulence and consequently is broken into speckle patterns, by means of an electronic camera system that is switched so as to be synchronous with the emitted pulse.

The lidar system is, for example, also suitable as a stationary ground measuring system. In this case, for example, certain regions of airports can be monitored in a targeted way for the presence of wake vortices or air turbulence, for example in the region of the runways for taking off and landing. By means of the invention the location of the vortices is measured with adequate accuracy so that pilots of aircraft can avoid the vortices. In particular it is possible to couple the measuring system to the flight control system so that when air turbulence in the direction of flight occurs, direct intervention in flight control takes place. In this case it is also possible for the aircraft to directly encounter the wake vortex. Similar to a driver assistance system in vehicles, in such an embodiment of the invention the influence which vortices have on flight movements is at least partly regulated out automatically so that hazardous situations are avoided.

Apart from the use in air traffic applications, the invention can also be used for other measuring tasks, in particular for measuring airstreams and air turbulence in clear weather in the region of wind farms.

As a result of the monostatic arrangement of the lidar system, in which arrangement the transmitter or laser and the receiver or detector or camera are situated in the same location, measuring of air turbulence can be carried out from a moving measuring arrangement, in particular from the aircraft. However, in the case of measuring from the ground, too, for example at an airfield or in a wind farm, the monostatic arrangement is associated with an advantage in that the transmit and receive beams can be aligned together in one device, which provides a significant advantage in particular in mobile applications.

In order to master these new relationships, namely the novel arrangement of transmitter and receiver, the larger distance from the measuring volume, and the movement of the measuring device, the invention proposes the following designs.

The transmission beam is preferably expanded coaxially to the receive beam in order to illuminate a larger area of the measuring volume at the aimed-at measuring distance, i.e. a larger measuring angle, wherein, for example, a camera simultaneously images the entire speckle field of the measuring volume. This obviates the need for serial scanning of the measuring volume.

As a result of the inhomogeneities in the atmosphere, the expanded laser beam cumulatively breaks up, along the entire travel path, into numerous individual intensity islands or objective speckles. To a viewer standing laterally beside the laser beam and looking towards the laser beam these intensity islands in the cross-section appear as elongated luminous filaments within the entire beam. If the entire beam were to impinge on a projection screen, then the speckles would appear as a granulation field within the cross-section of the laser beam, whose change over time would follow a transverse air movement. However, since it is not possible to erect a projection screen for measuring purposes, the invention further proposes that the atmosphere itself be used as a projection screen, i.e. to use the backscatter from an air screen of a defined thickness. Since the shutter speed of the camera is also very fast, the movement flow of the speckles is captured in snapshots.

The camera is, for example, placed such that it is directed along the axis of an expanded pulsed laser beam. A fast shutter speed of the camera can be used to determine this "atmospheric projection screen" of a defined thickness at a set distance as a "light-echo wall" of the speckles. After a certain transit time of the pulse, wherein the transit time or pulse corresponds to twice the light distance from the wall, the camera shutter is opened and shortly thereafter is closed, wherein the exposure interval then corresponds to the thickness of the reflection wall. For each pulse a momentary image of the intensity of the speckles is taken, not just on the outward path to the reflection screen but also on the return path from the wall to the receiver. In addition, as a result of light refraction and imaging of the optical receiving system so-called subjective speckles arise in front of the camera and its imaging aperture, which subjective speckles are superimposed on the objective speckles in the image of the camera.

In clear air the single scatter process is predominant, i.e. the fraction of multiply-scattered photons is so small as to be negligible in backscatter. Only in case of substantial aerosol density, i.e. in fog or in cloud, is the fraction of multiply-scattered photons on aerosols noticeable over extended travel paths, i.e. only along some tens of meters. In the context of the measuring methods under consideration in the present document, this means that the atmosphere reflects the light by multiple scatter in thin layers of some meters for the sheet-like illumination as a type of backscatter diffusing screen without lateral widening. The thin atmospheric layers can therefore be used as a type of projection screen that reflects the images, with no noticeable reduction in contrast as a result of lateral scatter, in the direction back to the projector. Due to the very limited ability of the air to backscatter, these images backscattered from the atmosphere are very weak when compared to images on a solid projection screen. However, by means of the pulsed shortwave laser radiation and typical pulse energies of commercially available lasers, it is possible to obtain useful signals from an extended layer covering several hundred meters of distance. This is to be shown in more detail below.

As mentioned above, atmospheric objective speckles arise as a result of a cumulative breaking up of an originally homogeneous laser beam along its direction of propagation into intensity speckles, i.e. into strong intensity modulation by interference of the partial waves due to refractive index variations in the air and scatter off aerosols over the entire beam cross-section. The intensity modulation and the size of the speckles are statistically distributed; they depend on the refraction-turbulence-structure parameter $C_n^2$ at the meteorological conditions prevailing at the time. This parameter is influenced both as a result of differences in pressure and differences in temperature in vortices, wherein the influence that temperature has on the refractive index is the larger, as mentioned above. The average diameter $d_o$ of the speckles in relatively still air is $d_o=(\lambda z)^{1/2}$, wherein $\lambda$ denotes the laser wavelength, and z denotes the distance from the laser source. At $\lambda=0.267$ µm and z=100 m, the average diameter would, for example, be $d_o=5$ mm, but because of their statistical size distribution the presence of both significantly larger and smaller speckles is to be expected.

The speckles, which, after the pulsed laser beam has left the lidar, have formed up to a predefined layer at a determined distance over the beam cross-section, become visible, as a result of the homogeneous backscatter characteristics of the air molecules, without an interfering lateral enlargement, as objective speckle granulation, i.e. as a distinct intensity distribution in the backscatter at this layer. Said speckles can be imaged by the camera that is affixed behind the receiving telescope. At a typical imaging factor of 1/100 and an original average diameter of the speckles of 5 mm, their diameter in the focal plane of the telescope is then 50 µm, which corresponds to five times the typical pixel diameter of a CCD camera of 10 µm.

In addition to the objective speckles, statistically distributed wave interference arises at the receiving aperture itself, which wave interference forms subjective speckles with a lower limiting value of the diameter of $d_s=1.2$ $\lambda$f/D, wherein D denotes the diameter of the receiving aperture. At $\lambda=0.267$ µm and an F-number of the receiving optics of F=f/D=10, $d_s$ then equals 3.2 µm or is equal to the image of a distant aerosol. However, in the case of the subjective speckles this is a lower limiting value, wherein larger speckles occur at greater frequency. Overall they are significantly smaller than the objective speckles and are thus not important to image evaluation.

In order to take images of speckles only from a determined measuring distance, the image-taking camera preferably comprises a time interval circuit that only images the light after a certain transit time of the emitted laser pulse, and closes again after a brief interval. This method of distance setting by pulse transit-time measuring makes possible gated viewing, i.e. time-limited image recording at the measuring location, or imaging of the backscatter or echo from an air disc of a defined diameter and thickness along the optical axis from a fixed distance that can be set by way of the pulse transit time.

Depending on whether the inhomogeneity of the refractive index or of the temperature in the turbulence at the time, or its velocity distribution is to be acquired, the invention preferably comprises two different aspects: A measuring the speckle image at different locations along the same measuring axis at the same time; and B twice measuring the speckle images as in A at defined brief time intervals. At A the refractive index gradient $\Delta n/\Delta r$ (x, y) and at B its change over time $\Delta n/\Delta r \Delta t$ (x, y) are taken.

According to a third aspect C of the invention, as an alternative to the use of speckles as a measuring probe for imaging the air turbulence or the air movement at the time, a spatially modulated laser beam (structured laser light) is used. In this arrangement, in addition or as an alternative to speckle measuring, both the refractive index variations $\Delta n/\Delta r$ (x, y) and their change over time $\Delta n/\Delta r \Delta t$ (x, y) can be shown with double pulses and with double exposure.

Below, the invention is described in an exemplary manner with reference to the drawings in which FIG. 1 shows a lidar system for measuring air turbulence according to a first preferred embodiment of the invention;

Figure 1:
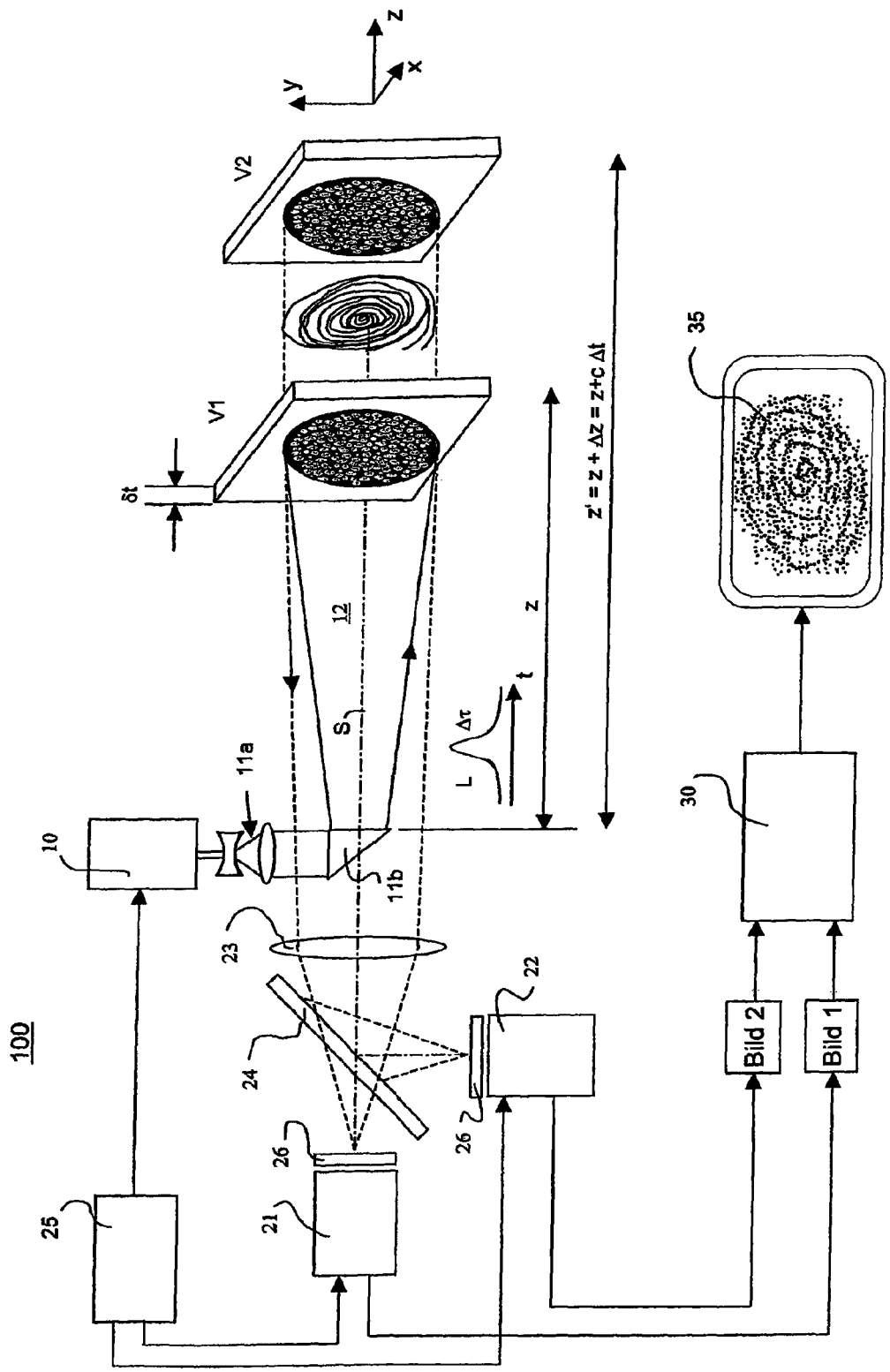

FIG. 1 shows a lidar system 100 for acquiring and measuring air turbulence according to a first preferred exemplary embodiment. The lidar system according to the invention comprises a laser 10 which by way of optics 11 comprising a lens arrangement 11a and a deviation mirror 11b emits a pulsed expanded laser beam 12 of a predetermined wavelength to a spatial area. A detector device 21, 22 is used for measuring the intensity distribution in the cross-section of the light backscattered from the spatial area, wherein measuring takes place at a first point in time t1 and at a second point in time t2 after the emission of a laser pulse L. A synchronisation unit 25 couples the detector device comprising the two detectors 21, 22 to the laser 10. The synchronisation unit 25 controls the detectors 21, 22 such that in each case measuring takes place at the two points in time t1 and t2 after emission of the laser pulse L. An evaluation unit 30 compares the intensity distributions measured by means of the detectors 21, 22 in order to determine any air turbulence from this comparison. The evaluation unit 30 is electronically coupled to an image representation system or a monitor 35 in order to present as an image the air turbulence determined in this way.

Figure 2:
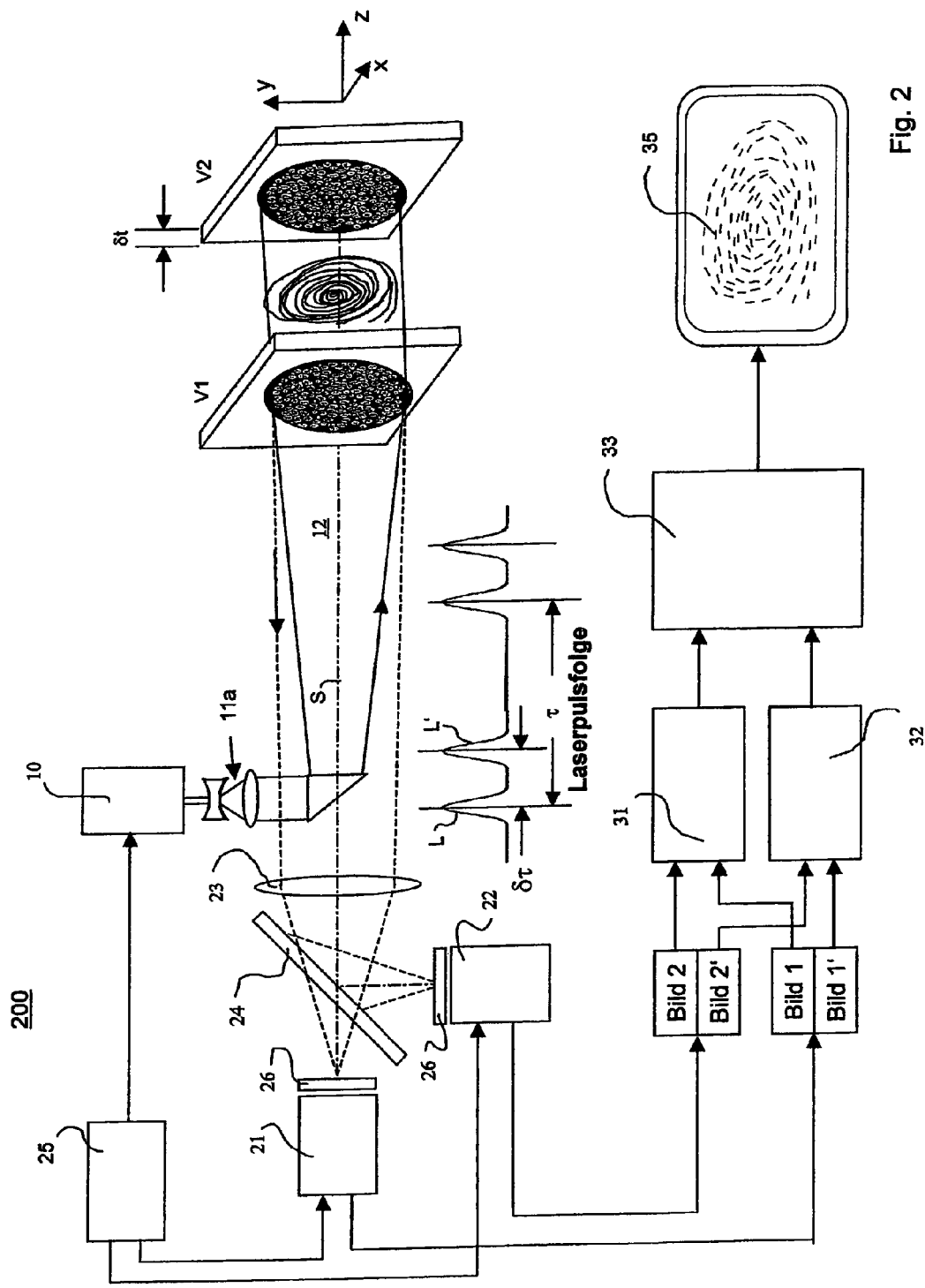
FIG. 2 shows a lidar system for measuring air turbulence according to a second preferred embodiment of the invention.

During the measuring process a laser pulse L is emitted, wherein the laser pulse L along its path penetrates the air and in so doing is scattered from air molecules and aerosols. FIG. 2 shows two measuring volumes V1 and V2 that are situated along the common beam axis S and that are spatially separate from each other. By way of a receiving telescope 23 and a beam splitter 24 the laser light backscattered from the two measuring volumes V1 and V2 reaches the detectors 21 or 22. The distance z of the first measuring volume V1 is determined by the point in time t1 after emission of the laser pulse L, at which point in time t1 detection of the backscattered light by means of the detector 21 takes place. The distance of the second measuring volume V2 is determined by the point in time t2 after emission of the laser pulse L, at which point in time t2 detection of the backscattered light by means of the second detector 22 takes place.

Cameras that record the detectors 21, 22 are cameras that record the scattering signals from the measuring volumes V1 and V2. In the example shown, two identical image amplifier cameras are used that share a common image taking axis with a beam splitter with the exposure times of said cameras being set, by means of a time interval circuit, so as to be synchronous with the emission of the laser pulse, so that said cameras record light signals along the axis or beam axis S from the spatially separate measuring volumes V1 and V2. By taking images with two separate cameras the scatter signals from the different measuring volumes V1 and V2 can be kept apart in time, although the transit time of the laser pulse L to the first or second measuring volume and back is extremely short. However, it is also possible to use a single camera whose speed is sufficient to separate the scattering signals from the two measuring volumes V1 and V2 that are situated one behind the other.

In the example shown in FIG. 1, the laser 10 is a single-pulse laser that uses laser pulses L with a pulse duration of $\Delta\tau$.

In the example shown, CCD image amplifier cameras are used as detectors 21, 22, each camera comprising an upstream image amplifier in the form of a multi-channel plate 26 (MCP). The MCP 26 carries out two tasks. The first task of the MCPs is, using the principle of a photomultiplier, to amplify the weak photoelectron current of the light signal from the photocathode in a plate comprising microchannels, before said photoelectron current subsequently reaches a phosphorus screen where it is registered by means of a CCD array. The second task of the MCP 26 is, by switching its amplifier voltage on in the time $t1=2t_o$ after the laser pulse (t=0) is emitted, to switch the camera 21 to receive the backscatter signal, and after $t1\epsilon=2(t_o+\sigma t)$ to switch it off again.

Analogous to the above, the MCP 26 of the second camera 22 switches to receive at $t2=2(t_o+\Delta t)$ and closes it again at $t2e=2(t_o+\Delta t+\sigma t)$, wherein $2\times\Delta t$ denotes the time interval between the two images being taken, and $2\times\sigma t$ denotes the respective identical duration of exposure of the two cameras 21, 22. At the speed of light c, $\Delta z=c\ \Delta t$ is the distance of the two measuring layers, at the thickness $\sigma z=c\ \sigma t$.

The images 1 and 2 of the two CCD cameras 21, 22 now show the speckles after the pulse transit times $2(t_o+\sigma t)$ and $2(t_o+\Delta t+\sigma t)$ that have arisen along the measuring path. They comprise the objective speckles on the path to the backscattering layers V1 and V2 and back, and the subjective speckles of the receiving system. After this a cross correlation (in the simplest case a subtraction) between the two images is conducted. The result is an image representation of the refractive index variations alone along the measuring field between the two layers V1 and V2, which comprises, for example, a vortex. Since the atmospheric influences are identical along the shared transit paths, they are not taken into account in the cross correlation so that only the influence of the share portion between the two layers remains.

As has been discussed above, this refractive index variation essentially reflects the temperature inhomogeneities of the turbulence. However, since such turbulence is continuously generated from the kinetic energy of the moved air and at the same time, as a result of heat diffusion and convection, disappears again from the vortices, this temperature field acts as a gauge that indicates the still existing structure of the turbulence.

With the use of periodically emitted laser pulses (e.g. 10 Hz) at a time interval $\tau$ it is possible, for example at a typical aircraft landing speed of 100 m/s, to obtain sectional images of the turbulence at a spacing of, for example, 10 m. At a typical switching time of the cameras of $2\times\sigma t$ the thickness of the atmospheric project screen would be $\sigma z=3$ m. In this case the layer distance between V1 and V2 is, for example, selected to equal the distance along which the aircraft flies between two pulses, $\Delta t=10$ m. However, it is understood that all the parameters, e.g. the measuring time $\sigma t$, the time between the laser pulses T and the time interval between taking the two images with the cameras $2\times\Delta t$, are selectable at will, within certain boundaries, and can, for example, be matched to the aircraft speed and the expected vortex velocity and the desired measuring resolution.

FIG. 2 shows a lidar system 200 according to a second preferred embodiment of the invention, by means of which embodiment the presentation of the development over time of the vortices is possible. In other words, it is not only possible to display the inhomogeneity of the air at the time, i.e. frozen in time, but it is also possible to obtain a direct image of the velocity field of the turbulent air. Components and elements of the lidar system shown in FIG. 2, which components and elements have essentially the same function as they do in the system shown in FIG. 1, have the same reference characters as in FIG. 1.

In the lidar system shown in FIG. 2, instead of a single laser pulse, in each case a pulse pair is emitted at a time interval of $\sigma\tau$. Lasers are available in the market that emit such double pulses with an adjustable time interval (e.g. 1-30 ms, usually two synchronously Q-switched lasers). The corresponding image amplifier cameras, which can take and store two images in very short variable time intervals, are also available.

In this arrangement the detectors 21, 22 are designed as double-exposure cameras or time-lapse cameras, and the laser 10 is designed as a double pulse laser.

With the combination of double pulse laser 10 and double-exposure cameras or time-lapse cameras 21, 22, by means of the first laser pulse L first a cross correlation of the images 1 and 2 from the measuring volumes V1 and V2 can be conducted, followed by a cross correlation of the images 1' and 2' that are taken with the second laser pulse L' from the same measuring volumes V1 and V2. From the thus obtained double images of the turbulence movement at different times, after a second correlation of the speckle shift, the velocities in the air movement are displayed. For example, if the time interval of the double pulses is 1 ms, and the air velocity in the vortex is 50 m/s, the speckles have moved by 50 mm. At an imaging ratio of 1/100 this corresponds to a shift of 500 μm in the focal plane of the camera with a pixel spacing of 10 μm.

A correlator 31 is used for correlation of the images 1 and 2 that are taken with the first pulse L, and a correlator 32 is used for correlation of the images 1' and 2' that are taken with the second pulse L'. A further correlator 33 is used for the second stage of correlation in which by correlation of the output signals of the correlators 31 and 32 the velocities of the air movement are determined.

Figure 4:
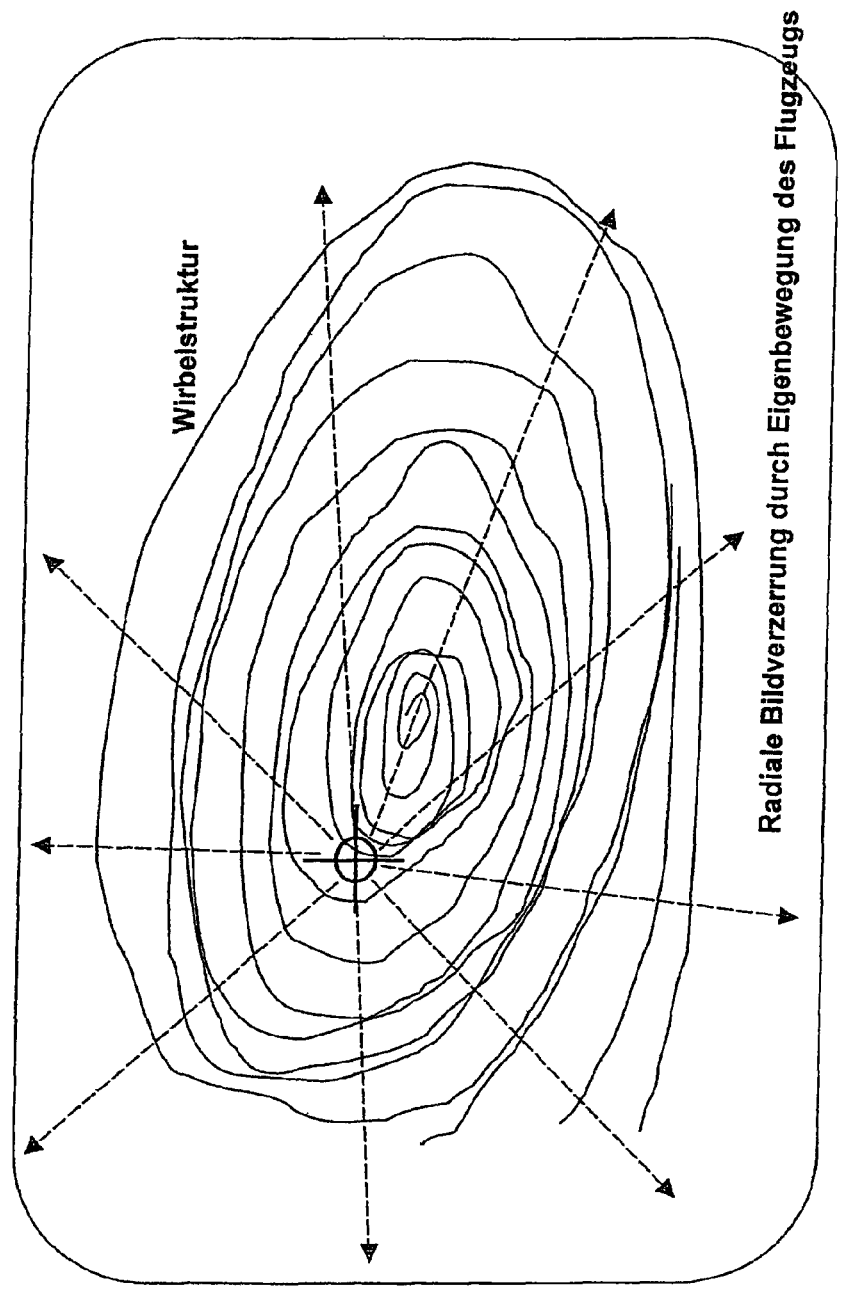
FIG. 4 shows an image representation of a vortex structure, which image representation is generated with the method according to the invention and the lidar system according to the invention, wherein radial image distortion occurs as a result of the aircraft's own movement, which aircraft carries the measuring system on board.

Presentation over time of the speckle movement is associated with an advantage in that at the same time the movement of the measuring axis of the aircraft is displayed in the image. In a time interval between the two pulses of $\Delta T=1$ ms, at an aircraft speed of v=100 m/s, it moves forward by 0.1 m. At a deviation angle from the axis of $\phi=1°$ the associated measuring point has radially moved from the movement axis by $\sigma r = \tau$ v tg$\phi$=1.7 mm or with a 1:100 imaging ratio by 17 μm in the camera plane, which corresponds to 1.7 times the pixel diameter. From the visual flow from this movement centre by way of a few series of measurements, the angles of attack and bank angles of the aircraft, projected onto the measuring layer, are derived, as shown in FIG. 4, which is of particular benefit to flight control.

Instead of using a double-exposure camera or time-lapse camera there is an option of using four individual cameras, wherein two cameras then in each case take an image of the backscattered light signals of the laser pulses, and all the cameras are brought into a shared optical axis by means of beam splitters.

In the embodiments shown in FIGS. 1 and 2 the direct laser beam is used as a measuring beam. Said measuring beam can have a smooth intensity gradient over the cross-section of the laser, e.g. a base mode with a Gauss profile. However, the intensity gradient can be broken into higher transverse modes and can vary from pulse to pulse. In the first approximation this does not influence the proposed method, because this additional intensity modulation is cancelled out during the correlation of the speckle images with the same laser pulse from different distances. Only the portion of the speckle change remains on the differential distance as part of the correlation.

Figure 3:
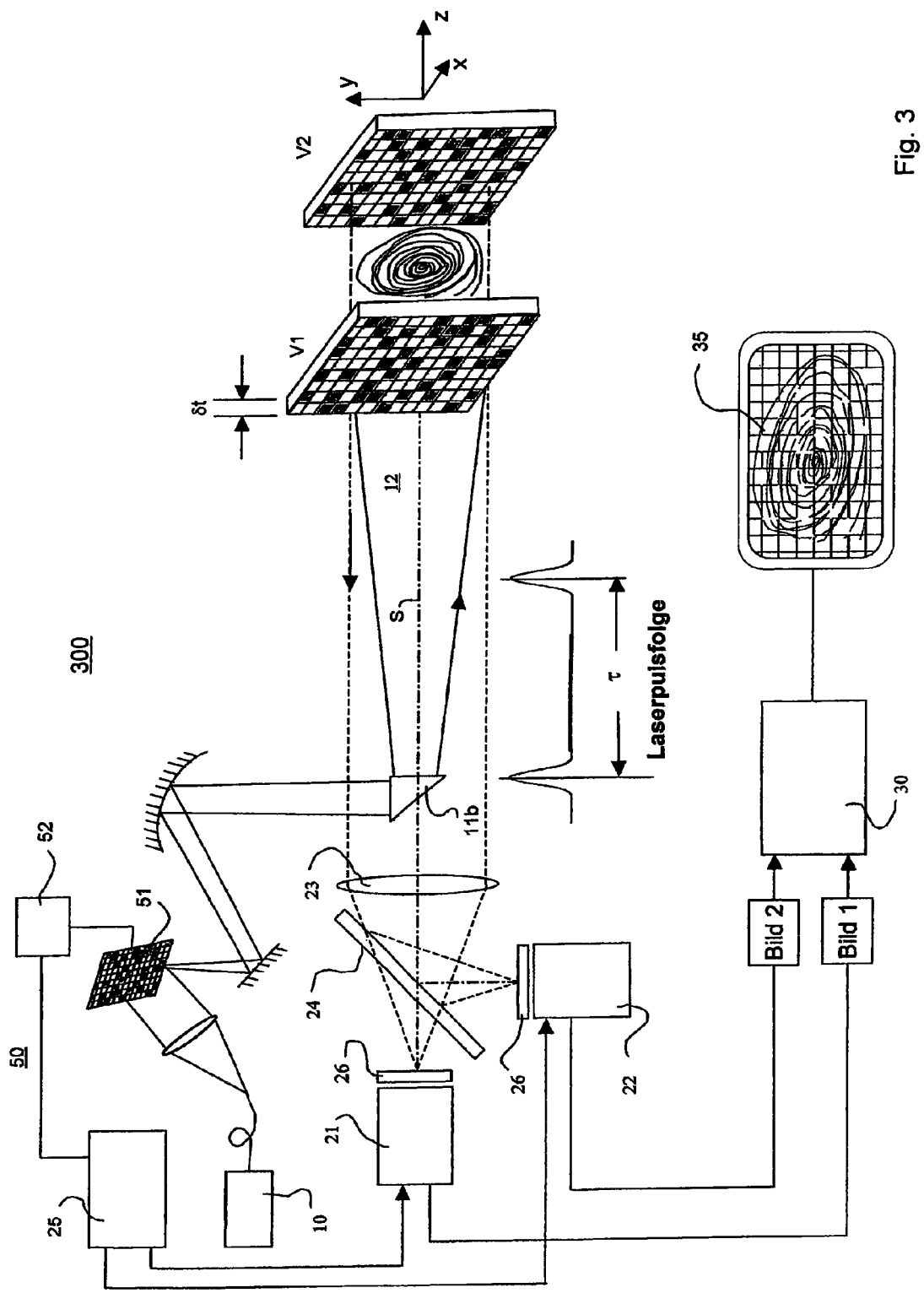
FIG. 3 shows a lidar system for measuring air turbulence according to a third preferred embodiment of the invention.

FIG. 3 shows a lidar system 300 in which a measuring beam S is generated, whose cross-sectional intensity gradient is statistically modulated through, by means of a spatial modulator 50, at the time when it leaves the lidar. In this arrangement the laser 10 emits light to a micro-display 51 which is controlled by way of a random image generator 52 in order to cause statistical modulation of the laser beam S. The remaining reference characters designate components and elements as already described above in the context of FIGS. 1 and 2.

In a manner that is analogous to that in the exemplary embodiments of FIGS. 1 and 2 described above, the image shift in the modulation patterns of the backscattered laser light is determined and used as a measure of the beam deviation in turbulence. As is the case in the examples provided for FIGS. 1 and 2, in this way it is possible to selectively acquire the disturbance of the air at the time, or to acquire the air movement at the time. The use of the embodiment shown in FIG. 3 is in particular suitable in those cases in which the speckle formation after passing through turbulence is not very pronounced, e.g. when broadband laser sources with only very short coherence length in time (e.g. femtosecond lasers) are used, or when laser sources are used that are spatially far extended, e.g. after the beam has passed through fibre bundles or diffusing screens.

In the embodiments shown there are various options for the optical design of the lidar system in relation to pulse energy, pulse interval, transmission beam diameter, transmission beam divergence of the laser transmitter, aperture diameter and focal length of the receiving telescope, and pixel number and pixel diameter of the cameras. There is also the option of using variable focal length zoom lenses as transmitting and receiving telescopes.

Since the measuring lenses or the individual vortices are almost rotationally symmetrical, and the vortex pair is axially anti-symmetrical, it is not necessary to image the entire cross-sectional area of both vortices without any gaps. Instead, it is sufficient if merely individual partial regions, e.g. measuring circles of a particular number and diameter, are imaged over the cross-section, which results in significant savings of laser pulse energy.

Figure 5:
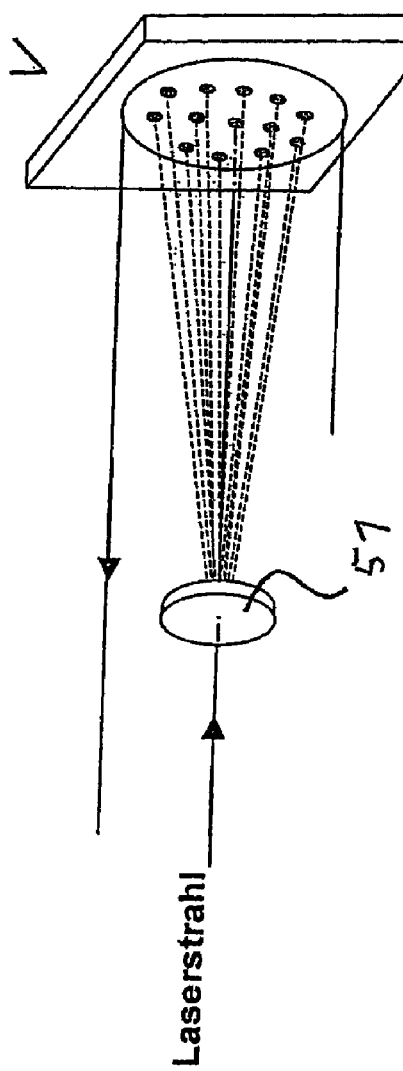
FIG. 5 shows a holographic beam splitter that splits the measuring beam according to a preferred exemplary embodiment of the invention into individual discrete measuring rays.
Figure 6:
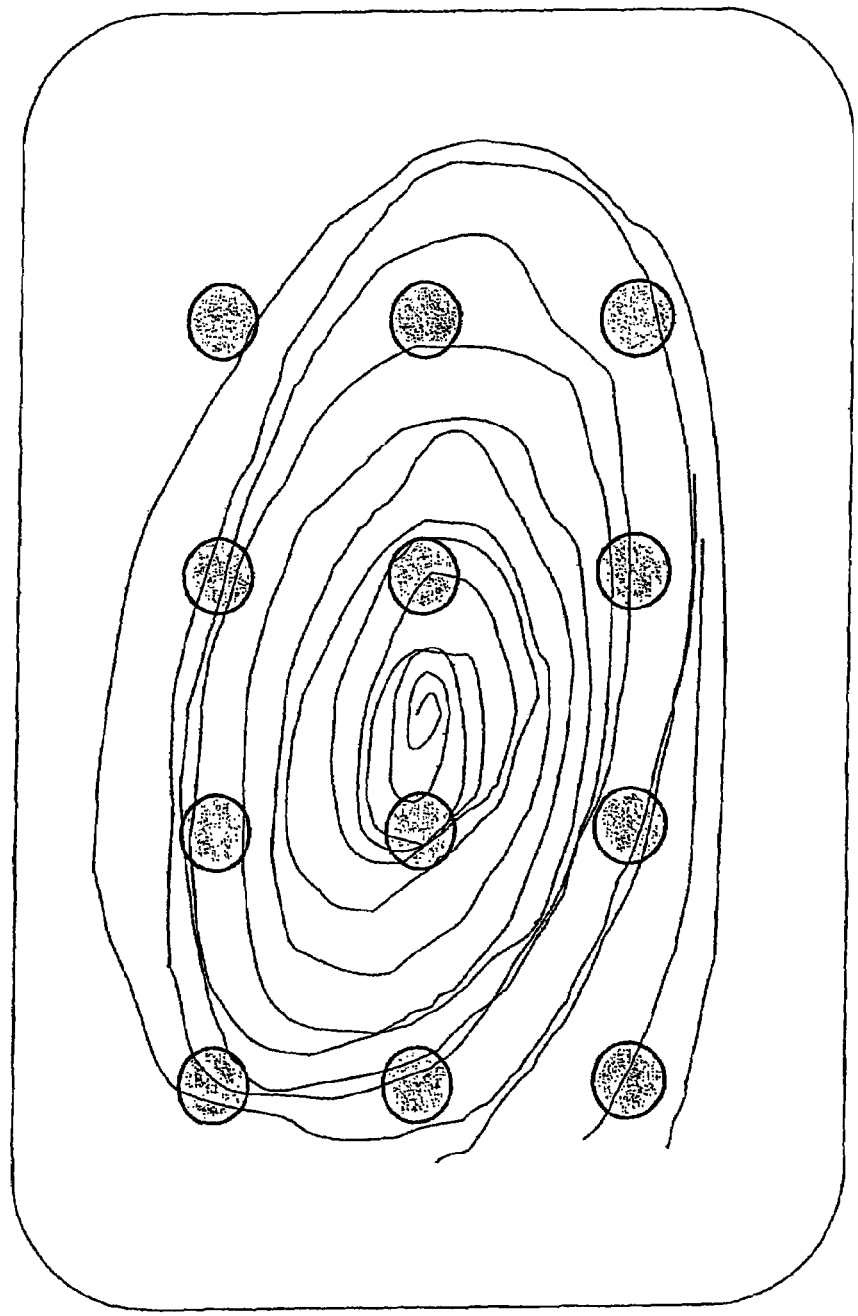
FIG. 6 shows an exemplary overlay of discrete circular measuring fields on a vortex structure.

For this purpose, according to a special design of the invention, division of the measuring beam into individual discrete measuring beams takes place by means of a holographic beam splitter or transmission grating 51, as shown in FIG. 5, which splits an incident laser beam by diffraction into a number of identical partial beams without this resulting in significant overall losses. The partial beams are then scattered or reflected by the atmospheric layer V that forms the measuring volume. As shown in FIG. 6, splitting a beam into 4×3 beams results in an illumination of a total of 64×48 pixels in the focal plane of the camera, which camera comprises, for example, an overall number of 640×480 pixels. With a zoom lens as a receiving telescope the measuring circles would be imaged differently, depending on the setting in the focal plane. Furthermore, a change of the holographic beam splitter 51 to a different number of measuring circles depending on the measuring distance would be possible.

It is a prerequisite of the invention that the intensity of the light signals of an expanded pulsed laser beam, which light signals are backscattered from the atmosphere, is sufficient to allow the taking of camera images of the speckles from a defined air layer at a determined measuring distance. This is to be shown below.

Backscatter takes place from air molecules and aerosols, wherein for speckle imaging the molecular scatter is more important due to its continuity. The intensity of the molecular scatter increases proportionally with shorter wavelengths at $\lambda^{-4}$, of the aerosol scatter proportionally with $\lambda^{-1.3}$, i.e. it is more favourable to image the scatter at the shortest possible wavelengths, i.e in the UV spectrum. Since the quantum efficiency of the photocathodes of image intensified multi-channel plate CCD cameras, which are suitable for the present application, is also very high (30-40%) the use of laser wavelengths in the UV range of 230 nm to 400 nm is proposed. Considering present-day technology, for example a frequency-quadrupled or frequency-trebled ND:YAG laser with the wavelengths of 266 nm and 355 nm may be considered for this purpose.

Wavelengths below 400 nm provide a further advantage in that in this case the laser safety regulations permit pulse energy that is higher by approximately $10^4$ than is the case with wavelengths above 400 nm. In the wavelength range of approximately 220 nm to 295 nm (Hartley band) there is a further advantage in that solar irradiation due to the absorption of the ozone layer at an altitude of 25-50 km drops to an imperceptibly small level (solar blind region), although transmission of the atmosphere over several hundred meters is hardly impeded, which significantly facilitates measuring very weak laser signals against a strong solar background.

The number of the received photons of the backscatter $N_p$ depending on the emitted $N_o$, the volume backscatter coefficient $\beta$, the atmospheric damping coefficient $\alpha$, the distance z and the aperture surface A of the receiving telescope, $T_o$ of the optical transmission of the lidar system, wherein c denotes the speed of light, and $\tau$ denotes the duration of measuring, can be calculated by means of the known lidar equation:

$$N_p = N_o(c\tau)\beta A/z^2 T_o \exp(-2\int_o^z \alpha dz)$$

or the number $N_E$ of the photoelectrons of the camera in relation to the pulse energy $E_o$ with $N_o = E_o(\lambda/hc)$, wherein h denotes Planck's constant, $\lambda$ the wavelength and Q the quantum efficiency of the photocathode, with:

$$N_E = E_o(\lambda/hc)(c\tau)\beta A/z^2 T_o \exp(-2\int_o^z \alpha dz)Q$$

Below, some design examples and numerical examples of a field of application of a lidar system in the sense of the invention are stated.

$\beta = 2.5 \times 10^{-5}$ $m^{-1}$ $sr^{-1}$ molecular volume backscatter coefficient of the atmosphere near the ground at $\lambda = 0.266$ µm z=100 m distance to the measuring volume $A = 3 \times 10^{-2}$ $m^2$ aperture area of a receiving telescope with D=20 cm aperture $\tau$=10 ns measuring duration with a layer thickness of $c\tau$=3 m $T_o$=0.4 as the total transmission of the optics Q=0.3 quantum efficiency of the photocathode exp.( )=0.8 transmission of the atmosphere up to 100 m measuring distance $E_o$=1 mJ $N = 2 \times 10^4$ photoelectrons per mJ of laser pulse energy With a pixel number of 64×48 and a pulse energy of 50 mJ, 325 photoelectrons would then result for illuminating a single image pixel, which is perfectly adequate as average pixel illumination. In other practical cases the values could be significantly different from the presently assumed values.

In the combination of fast-switchable and sensitive cameras, preferably a laser in the UV spectrum and possibly in the visual range would be used. In order to generate the typical laser pulses with a duration of 5 ns to 20 ns, at present solid-body lasers are most suitable, for example ND:YAG lasers at their base wavelength of 1,064 µm, frequency-doubled emission at 0.53 µm in the visible spectrum and trebled emission at 0.355 µm or quadrupled emission at 0.266 µm in the UV spectrum with a corresponding selection of photocathode materials of the camera, which are also all available in the market. Double-pulse lasers of this type with a continuous setting of the pulse interval from 1 to 20 ms are also available in the market.

Measuring turbulence fields on the ground in a wind farm and at the airport, or from an aircraft and linked to the flight control system, typically takes place at a measuring distance of 50 m to 200 m. The required measuring distance can be assumed to be typically 100 m; the necessary expansion of the laser beam in order to illuminate an area is a few degrees; the axial length of the desired measuring volume is 3 m (corresponding to a measuring duration of 10 ns); the pulse repetition frequency of the laser and the image sequence frequency of the camera is 10 to 20 Hz. The desired measuring resolution of the velocity in the air vortex is around 1 m/s; the typical image resolution is in the VGA format or 640×480 pixels, with a pixel diameter of the camera of 10 µm.

A transmitting telescope for expanding the laser beam and a receiving telescope for receiving the backscattered light from the atmosphere are used with parallel optical axes as is usual in the case of lidar systems. Results of numerical calculations and measurements show that a pulse energy of the transmission beam of 20-100 mJ for each pulse in a clear atmosphere is sufficient to ensure an adequate signal-to-noise ratio in the backscattered image, e.g. for the number of 100× 100 pixels.

In order to achieve a longer range, e.g. in excess of 1000 m (increasing the distance from 100 m to 1000 m equates to a factor of 100 in the reduction of the signal strength) e.g. the pulse energy can be increased, or the measuring duration, i.e. the thickness of the backscattered layer, can be selected to be correspondingly longer. For longer ranges it is also possible to significantly reduce the number of illuminated pixels.

In an imaging ratio of 1:100 of the receiving telescope, the pixel size at 100 m distance is 1 mm, and, at 1 m/s from one image to the other at a pulse interval of 1 ms, the path of a particle is 1 m/s×$10^{-3}$ s=1 mm or 1 pixel, compared to the speckle size of 5 mm. The depth of field of a typical receiving telescope of 20 cm aperture diameter and a focal length of 1 m, at 100 m distance, is approximately 20 m, which can comprise the axial extent of all typical vortices so that the latter can then be encompassed without having to refocus the telescope, and are encompassed merely by the time shift of the receiving region of the camera, in the stationary case with a longitudinal resolution of 3 m. Since the typical takeoff speed and landing speed of an aircraft is around 100 m/s, the aircraft moves forward by approximately 3 m between each two pulses of the laser and imaging by the camera. In such a case it would thus be possible to achieve the same conditions as in a stationary case, except without a time shift of the camera exposure from pulse to pulse.

All the measuring methods proposed in this document share a common characteristic in that, during every measuring process, area-shaped changes in a state are measured from a defined measuring volume at different times. In the case of stationary lidar systems this poses no particular problems. In this case the measuring location at a fixed pulse transit time is fixed, and the time interval between taking two images can be set with the use of double pulses with a settable time interval. Since a lidar system in the aircraft is in itself in motion, it must be ensured that despite the time difference between taking images the same measuring volume is acquired and that in spite of the aircraft's own movement any possible influence on the individual measurement remains minimal.

According to a particular aspect, the invention describes a method for acquiring and measuring air turbulence with a lidar system, in which method a pulsed expanded laser beam of a predetermined wavelength is emitted to a spatial area, and the light backscattered from this spatial area is received, wherein, after a determined transit time of the laser beam through the atmosphere, images of the intensity distribution in the cross-section of the laser beam are taken with cameras over a particular duration of exposure, after which the intensity distribution is evaluated.

Preferably, the intensity distribution is evaluated by breaking up the originally undisturbed laser beam into speckles in the air turbulence.

Advantageously, the laser beam whose intensity distribution has previously been modulated in the lidar, which laser beam has additionally been influenced in the air turbulence, is evaluated.

The invention claimed is:

1. A method for measuring air turbulence by means of a lidar system, in which method a pulsed expanded laser beam (12) of a predetermined wavelength is emitted to a spatial area, and light backscattered from this spatial area is received, characterised in that at a first point in time t1 and at a second point in time t2 after emission of a laser pulse (L) the intensity distribution in the cross-section of the backscattered light is measured, and from the comparison of both intensity distributions the air turbulence in a measuring field defined by the points in time t1 and t2 is determined, wherein by way of the respective measuring of the intensity distribution, speckle patterns, which during backscattering of the laser pulse (L) from air molecules and aerosols arise, are detected in the cross-section of the backscattered light, and from the comparison of the speckle patterns the air turbulence is determined.

2. The method according to claim 1, characterised in that images of the intensity distributions are taken at the two points in time t1 and t2 by means of a camera (21, 22) at a defined duration of exposure, and from the images that arise an image representation of the refractive index variation in the measuring field is produced.

3. The method according to claim 1, characterised in that cross correlation of the intensity distributions is conducted in order to display as an image the refractive index variation in the measuring field.

4. The method according to claim 1, characterised in that a multitude of laser pulses (L) are periodically determined in order to carry out a multitude of measurements at defined time intervals.

5. The method according to claim 4, characterised in that the method is carried out on board an aircraft, wherein the frequency of the emitted laser pulses (L) depending on the flight speed is selected such that air turbulence is determined at a defined distance in front of the aircraft.

6. The method according to claim 1, characterised in that with each laser pulse (L) a further laser pulse (L') is emitted in order to form a double pulse, wherein from each of the laser pulses (L, L') the air turbulence in the measuring field is determined, and by correlation of the two measurements the velocity of the air movement in the air turbulence is determined.

7. The method according to claim 6, characterised in that for each laser pulse (L, L') of the double pulse, images of the intensity distributions at the points in time t1 and t2 after emission of the respective laser pulse (L, L') are taken, wherein by means of two-fold correlation of the images the velocity of the air movement in the air turbulence is presented.

8. The method according to claim 1, characterised in that the emitted laser beam (12) over its cross-section is modulated in its intensity gradient.

9. The method according to claim 1, characterised in that the emitted laser beam (12) is split into a number of partial beams that form measuring circles within the expanded laser beam.

10. The method according to claim 1, characterised in that a double pulse laser (10) is used for generating the laser beam (12).

11. The method according to claim 1, characterised in that at least two cameras (21, 22) are used in order to take images of the intensity distributions at the points in time t1 and t2 after emission of the laser pulse (L).

12. A lidar system for measuring air turbulence, comprising:
a laser (10) for emitting a pulsed expanded laser beam of a predetermined wavelength to a spatial area, characterised by
a detector (21, 22) for measuring the intensity distribution in the cross-section of the light backscattered from the spatial area at a first point in time t1 and at a second point in time t2 after emission of a laser pulse (L);
a synchronisation unit (25) that couples the detector (21, 22) to the laser (10) in order to trigger measuring at the points in time t1 and t2; and
an evaluation unit (30; 31, 32, 33) that from a comparison of the measured intensity distributions determines air turbulence,
wherein the detector (21, 22) is designed for determining the position of speckles that arise when the laser pulse (L) is backscattered from air molecules, and the evaluation unit (30, 31, 32, 33) is designed for comparing speckle patterns in order to determine air turbulence from them.

13. The lidar system according to claim 12, characterised in that the detector (21, 22) comprises at least one camera which takes images of the intensity distributions at the two points in time t1 and t2 at a defined duration of exposure, wherein from the images that arise the evaluation unit (30; 31, 32, 33) produces an image representation of the refractive index variation in the measuring field.

14. The lidar system according to claim 12, characterised in that the evaluation unit (30; 31, 32, 33) is designed to conduct a cross correlation of the intensity distributions in order to display as an image the refractive index variation in a measuring field that is defined by the points in time t1 and t2.

15. The lidar system according to claim 12, characterised in that the laser (10) is designed to emit a multitude of laser pulses (L) in order to conduct a multitude of measurements at defined time intervals.

16. The lidar system according to claim 15, characterised in that it is designed for use on board an aircraft, wherein the frequency of the emitted laser pulses (L) depending on the flight speed is selected such that air turbulence is determinable at a defined distance in front of the aircraft.

17. The lidar system according to claim 12, characterised in that the laser (10) is a double pulse laser which with each laser pulse (L) emits a further laser pulse (L'), wherein from each laser pulse (L, L') the evaluation unit determines the air turbulence in the measuring field, and by correlation of the two measurements determines the velocity of the air movement in the air turbulence.

18. The lidar system according to claim 17, characterised in that for each laser pulse (L, L') of the double pulse the detector (21, 22) takes images of the intensity distributions at the points in time t1 and t2 after emission of the respective laser pulse (L, L'), and by means of two-fold correlation of the images the evaluation unit (31, 32, 33) presents the velocity of the air movement in the air turbulence.

19. The lidar system according to claim 12, characterised by a spatial modulator (50) which modulates the emitted laser beam (12) over its cross-section in its intensity gradient.

20. The lidar system according to claim 12, characterised by a holographic transmission grating (51) for splitting the emitted laser beam (12) into a number of partial beams.

21. The lidar system according to claim 12, characterised in that the detector (21, 22) comprises at least two cameras in order to take images of the intensity distributions at the points in time t1 and t2 after emission of the laser pulse.

22. The use of a lidar system according to claim 12 on board an aircraft.

23. An aircraft, characterised by a lidar system according to claim 12.

* * * * *

UNITED STATES PATENT AND TRADEMARK OFFICE
CERTIFICATE OF CORRECTION

Page 1 of 1

PATENT NO.         : 7,933,002 B2
APPLICATION NO.    : 11/996210
DATED              : April 26, 2011
INVENTOR(S)        : Thorsteinn Halldorsson It is certified that error appears in the above-identified patent and that said Letters Patent is hereby corrected as shown below:

Item (73) on the Title Page, corrected to read:

(73) Assignee: Airbus Operations GmbH (Hamburg, DE)

Signed and Sealed this
Seventh Day of June, 2011

David J. Kappos
*Director of the United States Patent and Trademark Office*